3,234,148
POLYMERIC COMPOUNDS CONTAINING SILICON-NITROGEN BONDS

Bernard John Aylett, Department of Chemistry, Westfield College, University of London, Kidderpore Ave., London, England, and George Murray Burnett, University of Aberdeen, Old Aberdeen, Aberdeenshire, Scotland
No Drawing. Filed Mar. 13, 1963, Ser. No. 264,765
Claims priority, application Great Britain, Mar. 15, 1962, 9,974/62
11 Claims. (Cl. 260—2)

The present invention relates to polymeric compounds containing silicon, and is particularly concerned with the production of polymers containing silicon and nitrogen atoms alternately in the polymer chain.

The invention provides new polymers which contain alternately difluorosilylene and substituted imino-groups in the polymer chain. The repeating unit of the polymer is (—$SiF_2$.NR—), where R is a lower alkyl group or a simple aryl group.

The new polymeric compounds provided by the present invention are stable solids, resistant to thermal degradation, and some polymers show elastomer-like properties, when suitably prepared.

The preparation of the new polymeric compounds is readily achieved by the pyrolysis of silicon tetrafluoride and the appropriate primary amine in the presence of a hydrogen fluoride acceptor. The pyrolysis normally takes several hours at a temperature between about 300 and about 400° C. Suitable hydrogen fluoride acceptors (Lewis bases) are alkali metal amides such as sodamide, potassamide, $NaNHMe$, and alkali and alkaline earth metal hydrides e.g. sodium, lithium calcium and barium hydrides, mixed hydrides such as lithium and sodium aluminum hydrides and borohydrides, certain metals e.g. Na/K alloy, powdered magnesium, aluminum, beryllium and zinc and certain boron hydrides e.g. diborane.

Silicon tetrafluoride and primary amines readily form adducts, which are generally of the form $SiF_4.2NH_2R$, when they are brought together at normal temperatures either with or without an inert solvent. These adducts are stable but begin to dissociate reversibly when heated to elevated temperatures, for example, $SiF_4.2NH_2Me$ begins to dissociate at about 180° C. and when heated in presence of sodamide it reacts in accordance with the following equation.

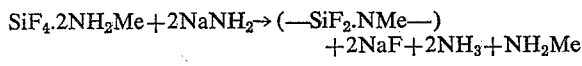

The polymeric materials may be prepared without the intermediate isolation of an adduct by causing an approximately stoichiometric mixture of silicon tetrafluoride to react with a primary amine (with the amine in slight excess) at an elevated temperature, preferably between about 300–400° C. with any of the hydrogen fluoride acceptors detailed above.

The separation of the inorganic salt from the polymer may be achieved in most cases by treating the mixture with water and filtering to leave the water insoluble polymer. If magnesium or aluminum powder is the hydrogen fluoride acceptor, separation may be carried out by vibrating the mixture, whereby the larger magnesium or aluminum fluoride crystals are moved away from the lighter polymer particles.

In an alternative method silicon tetrafluoride is made to react with a primary amine to produce an intermediate product which is usually a votaile liquid which can be readily removed from the reaction medium and pyrolysed separately e.g.

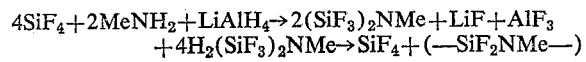

In yet a further method silicon tetrafluoride is made to react with a secondary amine, e.g., dimethylamine, according to the following equation

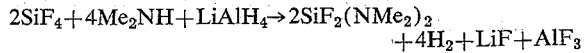

The intermediate product, e.g., bis-(dimethylamino)-difluorosilane, may be volatile and can then be purified by fractionation. When reacted with a secondary amine the intermediate undergoes amine exchange to produce a polymer, e.g., bis-(dimethylamino)-difluorosilane may be reacted with monomethylamine, according to the following basic equation

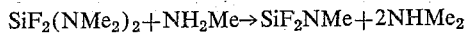

All the above reactions are conducted under anhydrous and inert conditions e.g. under nitrogen or in high vacuo in sealed reaction vessels.

The invention will now be further described by means of specific detailed examples.

Example 1

The adduct $SiF_4.2NH_2Me$ (1.5 g.) is heated at 350° C. for ten hours in a sealed tube with sodamide (0.8 g.). The product is then removed from the tube and shaken with 100 times its weight of cold water to remove metal salts and filtered to give the polymer as a light brown powder (0.2 g.).

Repetition of this example with magnesium powder in place of sodamide gives a similar product.

Example 2

Silicon tetrafluoride (4 mols.), methylamine (2 mols.) and lithium aluminum hydride (1.5 mols-excess) are placed in a sealed tube and heated to 250° C. for two hours. The volatile products are hydrogen, silane, unchanged silicon tetrafluoride and the new compound bis-(trifluorosilyl)-methylamine, $(SiF_3)_2NMe$. Bis(trifluorosilyl)methylamine is a liquid (B.P. 10° C.) and is readily purified by fractionation in high vacuo at −120° C. Analysis: F 55.2%, amine on hydrolysis 14.5%, M.W. 197. When heated in a sealed tube at 100° C. for six hours, it decomposes to yield silicon tetrafluoride and the pure polymer $(SiF_2NMe)_x$, a white solid. Analysis: F 38.9%, amine 31.0% by weight. Conversion is 87%.

Example 3

Silicon tetrafluoride (2 mols.), dimethylamine (4 mols.) and lithium aluminium hydride (1.5 mols-excess) are placed in a sealed tube and heated at 220° for 12 hours. The volatile products are hydrogen, silane, silicon tetrafluoride and bis-(dimethylamino)-difluorosilane. Bis-(dimethylamino)-difluorosilane is a liquid (B.P. 96° C.) that may readily be purified by fractionation under nitrogen. Analysis: F 23.6%, amine 56.8% by weight, M.W. 153. When heated with methylamine (6 mols.) in a sealed tube at 200° for 8 hours, it yields the required polymer by an amine exchange reaction. The extent of conversion is of the order of 99%. The polymer is a white solid.

The new polymeric compounds are stable and inert. They are insoluble in most organic solvents and water, but dissolve in concentrated sulphuric acid and concentrated perchloric acid. The polymers are not attacked by aqueous alkali but fusion with a solid alkali such as sodium hydroxide leads to decomposition.

The higher molecular weight polymers do not melt below 500° C. and show no obvious signs of decomposition at this temperature. If a flux, such as sodium fluoride, is added to the polymer melting takes place between 350 and 400° C., but without apparent decomposition.

The precise pyrolysing conditions and the particular hydrogen fluoride acceptor used may alter the physical properties of the polymer; variation from soft pliable solids to rigid solids being possible. For example, pyrolysis in the presence of aluminium leads to polymers with elastomer-like properties. The procedure of Example 1 gives higher molecular weight polymers with the greatest stability and thermal resistance and in order to produce molded articles therefrom depression of the softening point by means of a flux is necessary. Polymers produced as described in Examples 2 and 3 have lower molecular weights and can be shaped into moldings or other formed articles at lower temperatures.

We claim:

1. Solid polymers consisting of a repeating structural unit of formula —$SiF_2$—NR— wherein R is selected from the group consisting of alkyl and aryl groups.

2. Solid polymers as in claim 1 wherein R is a lower alkyl group which is unbranched at the alpha carbon atom.

3. Solid polymers consisting of the repeating structural unit —$SiF_2NCH_3$—.

4. A process for the production of polymers consisting of a repeating unit of the formula —$SiF_2$—NR— wherein R is selected from the group consisting of alkyl groups and aryl groups which comprises reacting silicon tetrafluoride and a primary amine of the formula $RNH_2$ wherein R is as defined above together under anhydrous conditions for a reaction period in the presence of a Lewis base and pyrolysing the reaction mixture during at least the latter part of the reaction period; the Lewis base being selected from the group consisting of alkali metal amides, alkali metal and alkaline earth metal hydrides, alkali metal aluminohydrides and borohydrides, boron hydrides, powdered magnesium, aluminum, beryllium, zinc, and a sodium-potassium alloy.

5. Process according to claim 4, in which R represents methyl.

6. Process according to claim 4, in which the pyrolysis temperature is from 300 to 400° C.

7. A process as in claim 4 wherein the silicon tetrafluoride and primary amine are present before being reacted in the presence of said Lewis base as an adduct of the formula $SiF_4 \cdot 2NH_2R$.

8. A process as in claim 4 wherein, before said pyrolysing, the silicon tetrafluoride and primary amine are reacted in about stoichiometric amounts forming an amine of the formula $(SiF_3)_2NR$, R being as defined in claim 10.

9. A process for producing a solid polymer consisting of the repeating structural unit —$SiF_2NCH_3$— comprising the steps of reacting silicon tetrafluoride and methyl amine in the presence of lithium aluminum hydride in about stoichiometric amounts under inert reaction conditions and pyrolysing the resulting product to form the desired solid polymer.

10. A process for producing a solid polymer consisting of a repeating unit of the formula —$SiF_2NR$— wherein R is a member selected from the group consisting of alkyl and aryl groups, comprising the steps of reacting silicon tetrafluoride and a secondary amine of the formula $R_2NH$ wherein R is as defined above in the presence of a Lewis base to form an intermediate amine of the formula $SiF_2(NR_2)_2$, and reacting this intermediate amine with a primary amine of the formula $RNH_2$ wherein R is as defined above to form the desired polymer, said Lewis base being selected from the group consisting of alkali metal amides, alkali metal and alkaline earth metal hydrides, alkali metal aluminohydrides and borohydrides, boron hydrides, powdered magnesium, aluminum, beryllium, zinc and a sodium-potassium alloy.

11. A process as in claim 10 wherein R is a methyl group.

References Cited by the Examiner

UNITED STATES PATENTS

| | | | |
|---|---|---|---|
| 2,759,958 | 8/1956 | Fitch | 260—448.2 |
| 3,143,514 | 8/1964 | Boyer | 260—2 |

OTHER REFERENCES

Schumb et al: "Jour. American Chem. Soc.," vol. 75, Dec. 5, 1953, pp. 6085–6.

MURRAY TILLMAN, *Primary Examiner.*

SAMUEL H. BLECH, *Examiner.*